Dec. 13, 1938.  W. RABKIN  2,140,331

STRENGTH TESTING MACHINE

Filed Jan. 9, 1937  6 Sheets-Sheet 1

INVENTOR
WILLIAM RABKIN.
BY
ATTORNEY

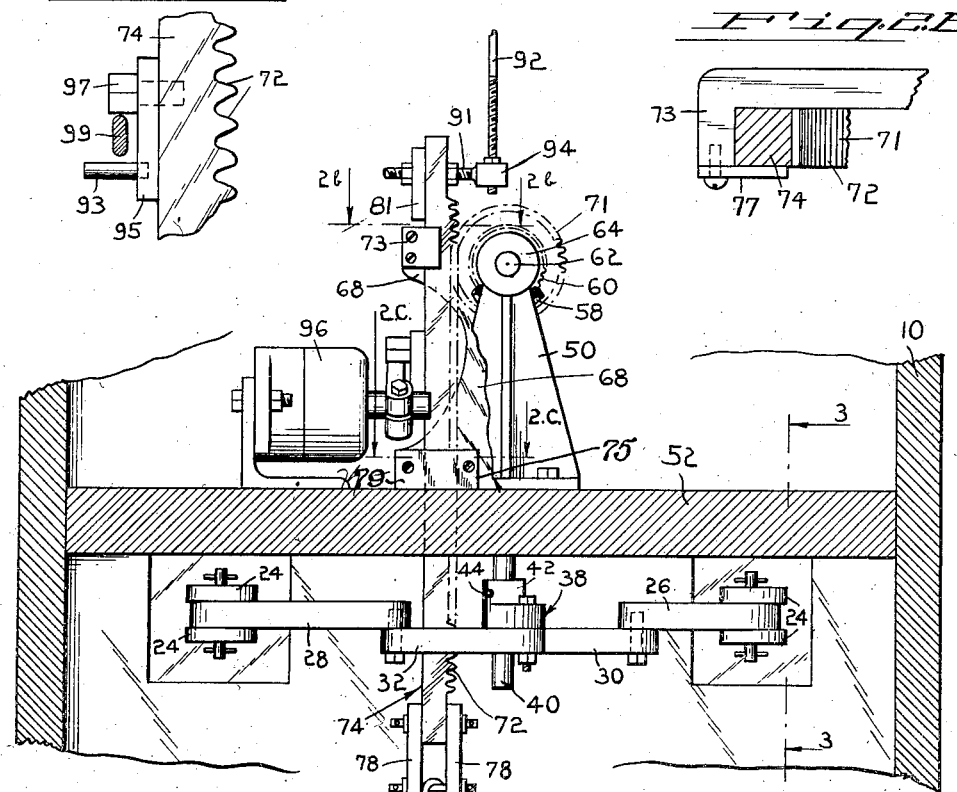

Dec. 13, 1938. W. RABKIN 2,140,331
STRENGTH TESTING MACHINE
Filed Jan. 9, 1937 6 Sheets-Sheet 3
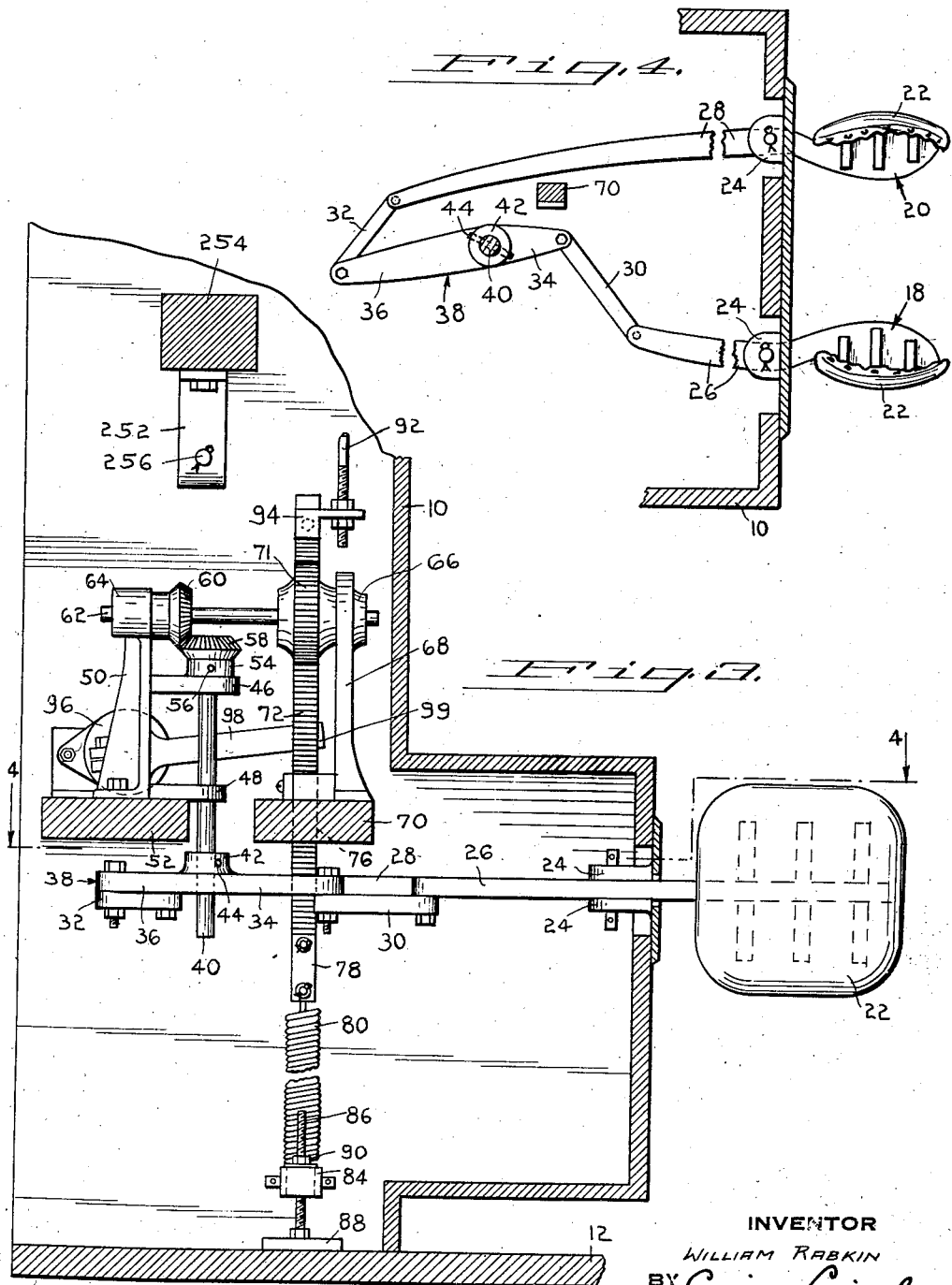

Dec. 13, 1938.  W. RABKIN  2,140,331
STRENGTH TESTING MACHINE
Filed Jan. 9, 1937    6 Sheets-Sheet 4
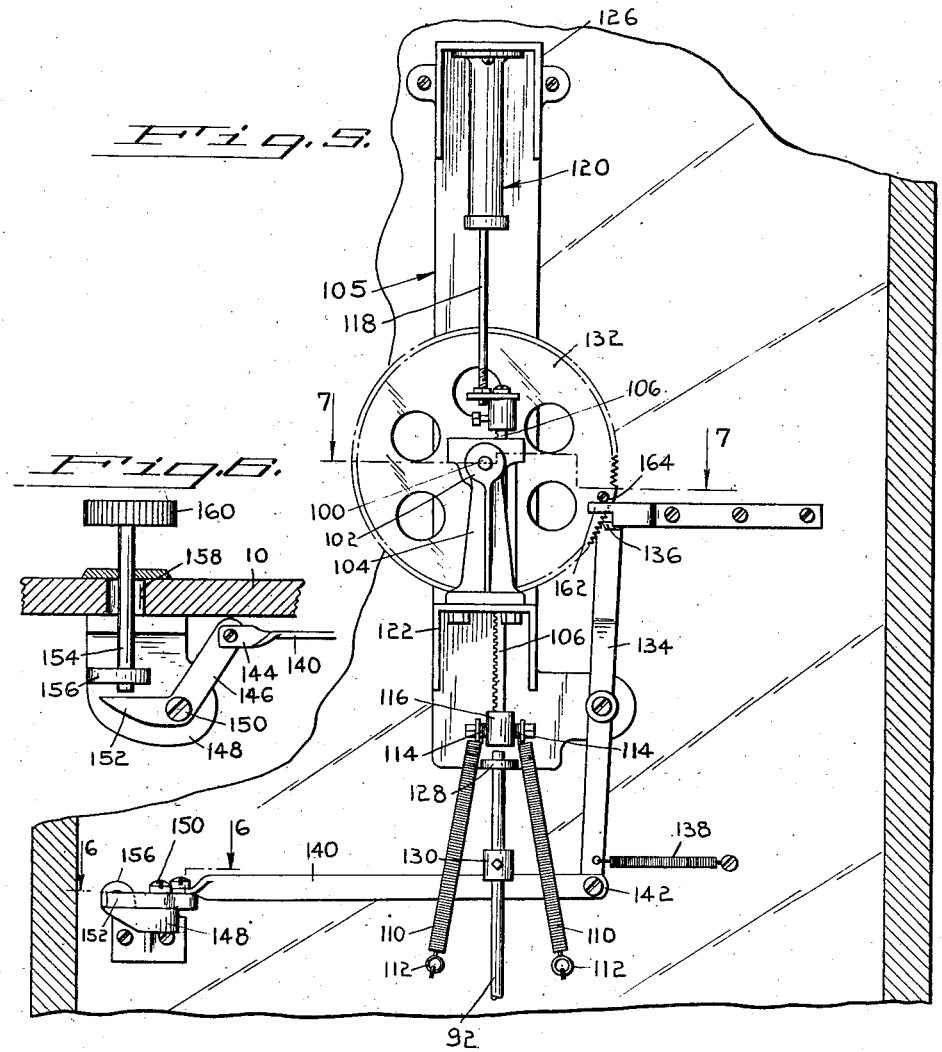

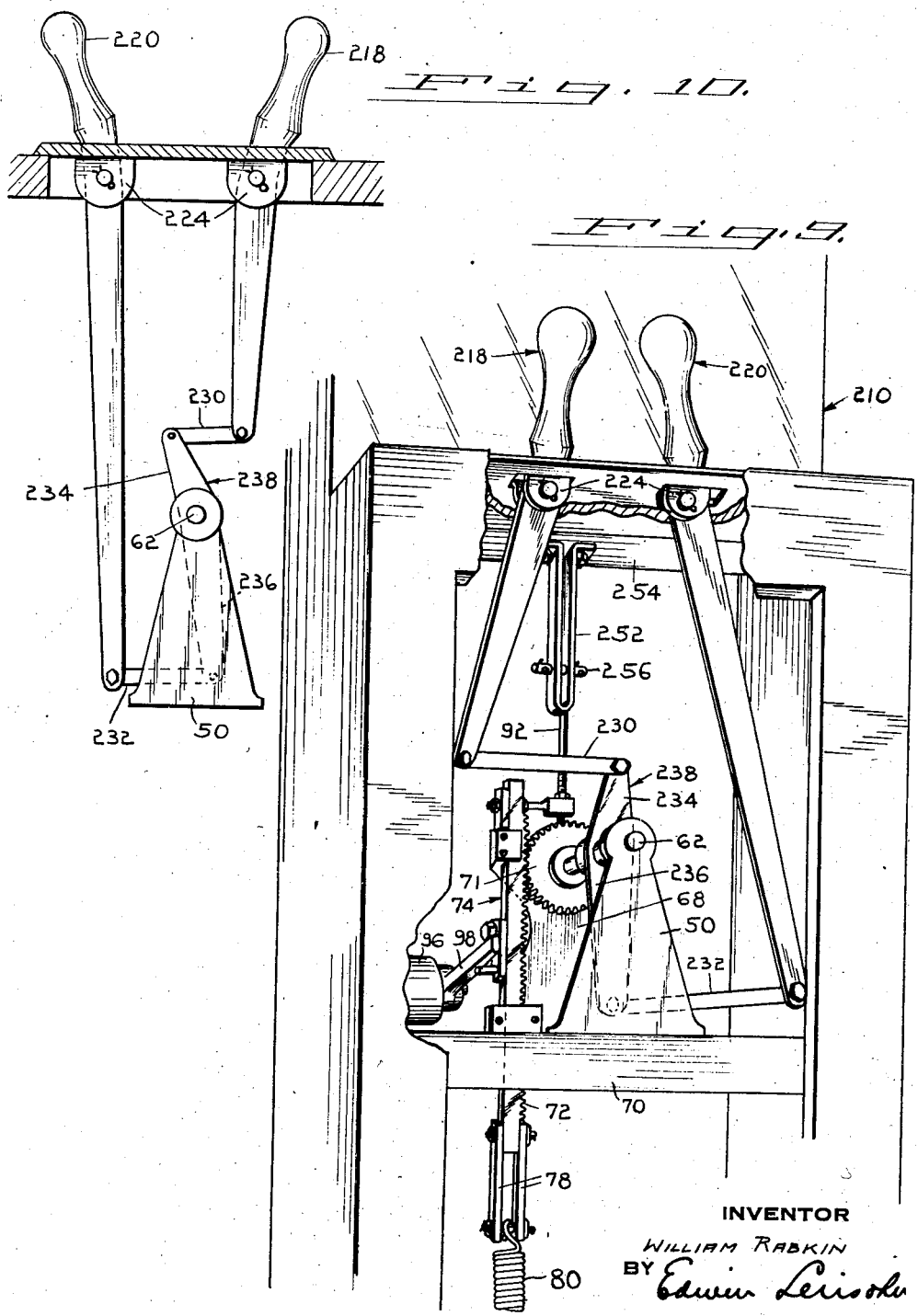

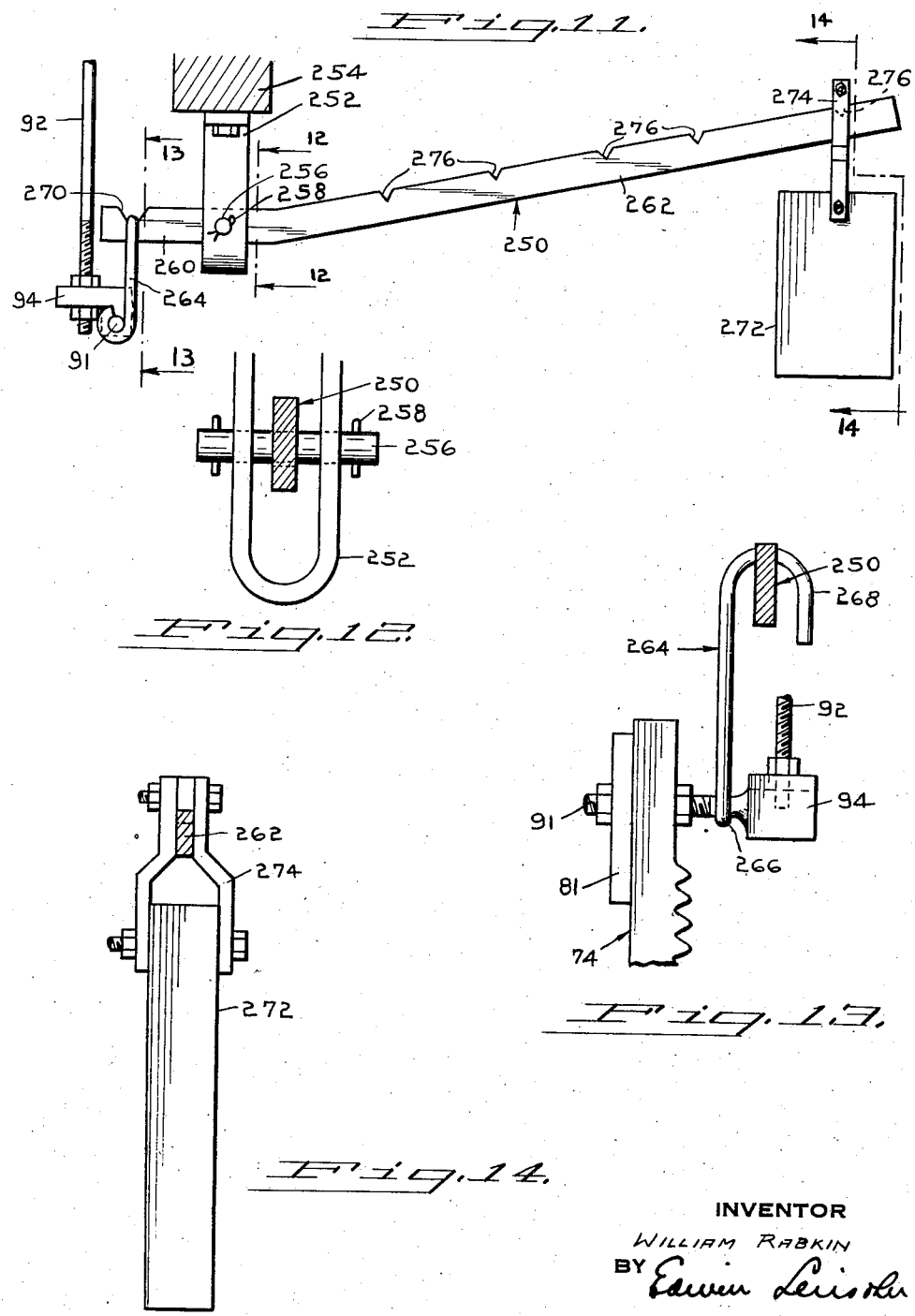

Patented Dec. 13, 1938

2,140,331

UNITED STATES PATENT OFFICE 2,140,331

STRENGTH TESTING MACHINE

William Rabkin, New York, N. Y.

Application January 9, 1937, Serial No. 119,780

8 Claims. (Cl. 265—22)

The present invention relates to strength testing machines.

One of the objects of the present invention is to provide a strength testing machine which is rugged in construction and reliable in operation whereby to fully meet the requirements of municipal and other government authorities for machines used in the physical examination of candidates for certain civil service positions, as for example, those of policemen and firemen.

Another object of the invention is the provision of a series of machines for testing the strength of various parts of the body.

A further object of the invention is to provide for the maximum standardization of parts so that to a considerable extent at least parts of similar construction may be utilized in any one of the series of machines for testing the strength of various parts of the body.

Another object of the invention is to provide means for improving the accuracy of the indicating mechanism of the machines.

Another object of the invention is to protect the indicating mechanism against shock in its operation by the rugged mechanism actuated during the operation of the machine in testing the subject's strength.

A further object of the invention is to provide simple means for readily and conveniently calibrating machines or for testing the accuracy thereof.

A yet further object of the invention is generally to improve the construction and operation of strength testing machines with special reference to their simplicity of construction and reliability of operation.

The above objects of the invention and other objects which might hereinafter appear will be fully understood from the following description considered with reference to the accompanying drawings forming a part of the present specification.

In the drawings:

Fig. 2A is a detail view in elevation of certain parts shown in Fig. 2;

Figs. 2B and 2C are detail sectional views on the lines 2b—2b and 2c—2c, respectively, of Fig. 2;

Fig. 3 is a sectional view on the line 3—3 of Fig. 2;

Fig. 4 is a sectional view on the line 4—4 of Fig. 3;

Fig. 5 is a rear view of the mechanism in the upper part of the cabinet;

Figures 1, 2:
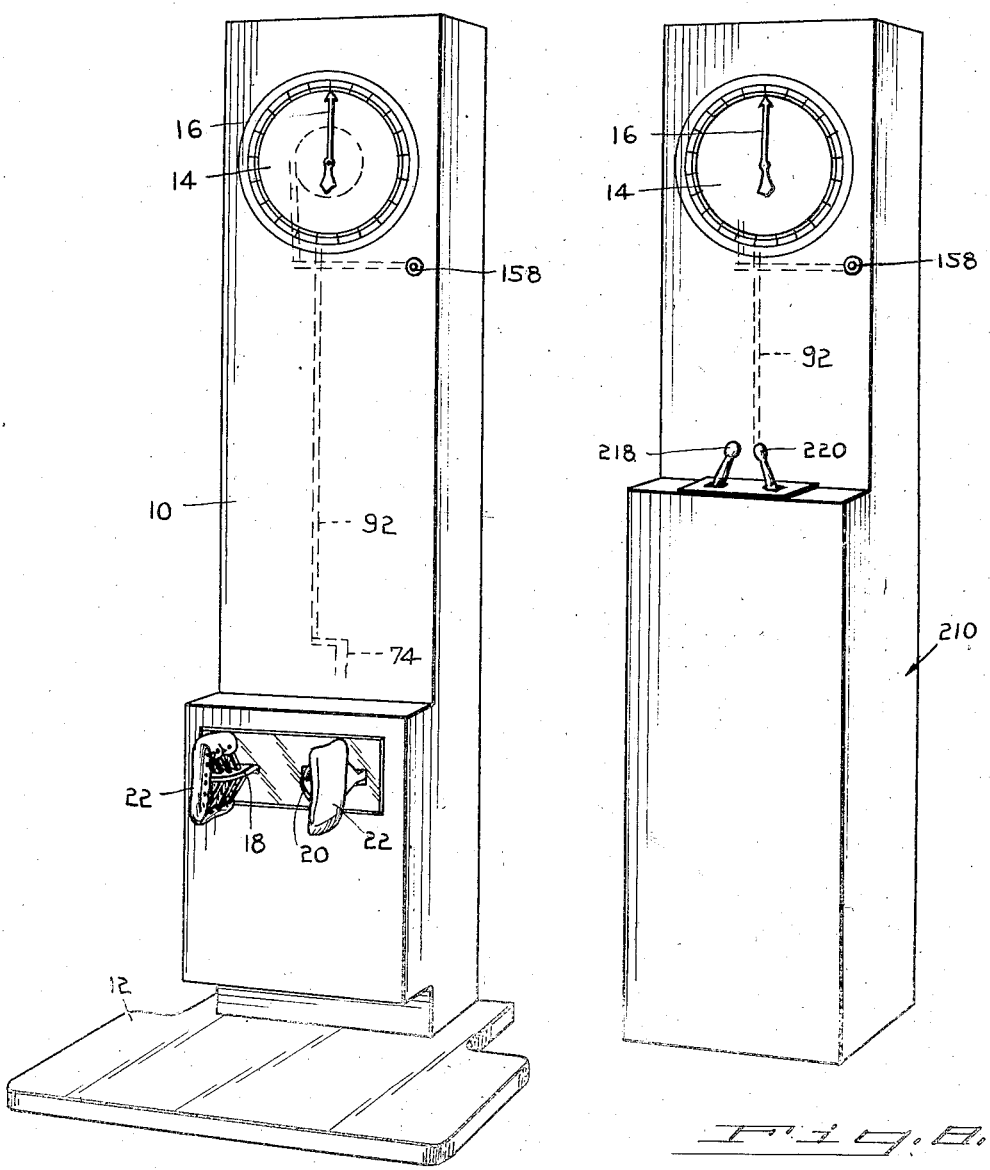
Fig. 1 is a perspective view of one of the strength testing machines embodying the present invention.
Fig. 2 is a rear elevational view of the mechanism in the lower part of the cabinet shown in Fig. 1.

Figs. 6 and 7 are detail plan views partly in section on the lines 6—6 and 7—7, respectively, of Fig. 5;

Fig. 8 is a perspective view of another strength testing machine embodying the present invention;

Fig. 9 is a fragmentary front perspective view of part of the machine shown in Fig. 8, part of the cabinet being removed;

Fig. 10 shows an arrangement of the levers for a machine which is of the same construction as the machine illustrated in Figs. 8 and 9, except that the actuating levers are arranged for being moved toward each other instead of away from each other;

Fig. 11 is a side view of the means for calibrating or for testing the accuracy of the machines;

Fig. 12 is a sectional view on the line 12—12 of Fig. 11;

Fig. 13 is a sectional view on the line 13—13 of Fig. 11;

Fig. 14 is an end elevational view on the line 14—14 of Fig. 11.

Referring to the drawings in detail, and first to the strength testing machine shown in Fig. 1, said machine as here shown comprises a cabinet 10 mounted on a broad base 12 whereby said cabinet is supported in stable upright position without securing the base 12 to the floor. Indicating means including a dial 14 and a pointer 16 are provided at the front upper part of the cabinet. As here shown, the dial is calibrated in percentages of the assumed normal strength of the part of the body subjected to test. The pointer 16 is operated by suitable mechanisms, which will hereinafter be described in detail, which mechanisms are actuated by levers 18 and 20 which project from the lower part of the front wall of the cabinet at a height above the base 12 corresponding approximately to the height of a man's knees. The machine here shown is intended for testing the thigh adductors and in this test, the subject stands on the base 12, straddles the padded ends 22 of the levers 18 and 20 and presses said levers toward each other as far as he can by means of his thighs, his strength in that regard being indicated by the pointer 16 on the dial 14.

Referring now more particularly to Figs. 2, 3 and 4, it will be observed that the levers 18 and 20 are pivotally mounted in brackets 24 adjacent the front wall of the cabinet. The lever arms 26 and 28 project rearwardly and are pivotally connected by means of links 30 and 32, respectively, to the arms 34 and 36, respectively of a lever 38. Said lever 38 is fixed to a vertical shaft 40. For that purpose the lever is provided with a boss 42, and a pin 44 is passed through aligned openings in said boss and shaft. Said shaft 40 is mounted for rotation in bearings 46 and 48 which project from a standard 50 mounted on a horizontal support 52 extending across the cabinet. The shaft 40 is supported on the upper surface of the bearing 46 by the boss 54 which is fixed to the upper end of the shaft by a pin 56. Said boss is an integral part of a bevel gear 58 which meshes with a bevel gear 60 on a horizontal shaft 62.

The horizontal shaft 62 is journalled at its ends in a bearing 64 formed in the standard 50 and in a bearing 66 formed in a standard 68 mounted on a support 70 which extends across the cabinet 10 in spaced relation to the support 52. A pinion gear 71 is fixed to the shaft 62 adjacent the bearing 66 and meshes with a rack 72 on a vertically disposed member 74 arranged to move vertically through an opening 76 in the support 70. The lower end of the movable member 74 is connected by means of pivoted coupling bars 78 to the upper end of resistance means here shown as a strong spring 80. The lower end of said spring is connected by means of a pin 82 to a block 84 slidably and adjustably mounted on vertical screw-threaded rods 86 fixed to a plate 88 secured to the bottom of the cabinet. Said block is held in adjusted position on the screw-threaded rods 86 by means of nuts 90. The upper end of the movable member 74 is connected to a rod 92 by means of a bracket 94 which is fixed to the lower end of said rod and to a bolt 91 fastened to the upper end of movable member 74. The member 74 is guided for vertical movement by an upper guide member 73 integral with the upper end of the standard 68 and in a guide 75 integral with the base of said standard, removable plates 77 and 79 being provided for said guides 73 and 75, respectively, to permit the insertion and removal of the member 74.

The operation of the parts thus far described is relatively simple and is as follows: Normally, when the parts of the machine thus far described are at rest, the spring 80 maintains the movable member 74 in retracted position. When the machine is operated by pressing the levers 18 and 20 toward each other, the lever 38 is caused to rotate the shaft 40, and through the gears 58 and 60 the shaft 62 is simultaneously rotated. The rotation of the shaft 62 causes the pinion 71 by engagement with the rack 72 of the member 74 to move the latter upwardly against the tension of the spring 80 and thereby raises the rod 92. When the levers 18 and 20 are released the spring 80 returns the member 74 to retracted position. As said spring is very strong, its action in returning the movable member 74 to retracted position and the rest of the mechanism to initial position may result in considerable shock to the mechanism. To obviate this difficulty, provision is made for retarding and cushioning the return movement of the member 74 and the parts associated therewith. The means provided for this purpose comprises as here shown a hydraulic shock absorber 96 having a rigid movable arm 98 connected at its end 99 to the movable member 74. As shown more clearly in Fig. 2a, the end portion 99 of the shock absorber arm 98 is received between a pin 93 fixed to a plate 95 and the head of a bolt 97 by which said plate is fastened to member 74. The return movement of the member 74 is limited by a stop plate 79 bolted to the upper end of said member in position to engage the top edge of the guide 73 when member 74 reaches retracted position. Said shock absorber 96 not only prevents shock and damage to the machine by preventing a too rapid return of the member 74 to retracted position, but also opposes a rapid movement of the member 74 to projected position and thereby eliminates or greatly reduces the factor of momentum in the actuation of said movable member. By thus greatly reducing, if not eliminating entirely the factor of momentum in the operation of the machine a more accurate indication of the person's strength is obtained, than if the subject were permitted to utilize the factor of momentum in the operation of the machine.

The manner in which the indicating mechanism, including the pointer 16 is actuated will now be described, reference being had more particularly to Figs. 5 to 7. The pointer 16 is fixed to the forward end of the rotatable shaft 100 which is journalled in a bearing 102 at the upper end of a standard 104, and in a bearing 103 formed in a plate 105 secured to the cabinet wall. Said shaft is rotated by a rack 106 which meshes with a pinion 108 fixed to the shaft. The rack is normally held in retracted position by springs 110 fixed at their lower ends 112 to the front wall of the cabinet and at their upper ends 114 to a block 116 at the lower end of the rack. The upper end of said rack is connected to the piston rod 118 of a dash pot 120 whereby the momentum and inertia factors of the parts are prevented from affecting the movement of the pointer 16. It will be observed that the standard 104 is supported on a shelf 122 formed on the plate 105 and that the cylinder of the dash pot 120 is suspended from a similar shelf 126 of said plate. It will be observed also that the upper end of the rod 92 is movable through an apertured guide lug 128 formed at the lower end of the plate 105 and that said rod 92 is provided with an adjustable stop member 130 which limits the upward movement of the rod and the corresponding movement of the rack 106.

As clearly shown in Fig. 5, when the movable member 74 and its associated part or rod 92 are in retracted position, the upper end of the rod is spaced from the block 116 of the rack 106 when the latter is in retracted position. Thus, a lost-motion connection is provided between the indicating mechanism and the operating mechanism of the machine. This permits the operating mechanism including the movable member 74 and rod 92 to return to retracted position independently of the return movement of the rack 106 and the rest of the indicating mechanism associated therewith. The lost motion connection also contributes to the accuracy of the machine, as the indicating mechanism is not subjected to the effect of any abrupt movement of the rod 92 which may occur at the initiation of the actuation of the operating mechanism against the force of the strong spring 80, although as indicated above, the tendency of the operating mechanism to abrupt and jerky motion is reduced considerably, if not entirely eliminated by the shock absorber 96.

In accordance with the present invention, provision is made for retaining the pointer releasably in indicating position so that the reading on the dial may be obtained after the subject has released the levers 18 and 20. For this purpose a releasable pawl and ratchet mechanism is provided, and as here shown (Figs. 5, 6 and 7) comprises a relatively large ratchet wheel 132 fixed to the pointer operating shaft 100 and a pivoted pawl lever 134 having a detent 136 in engagement with the teeth of the ratchet wheel 132 and normally held in engagement therewith by a spring 138. It will be understood that the detent 136 permits the rotation of the shaft 100 when the latter is rotated by upward movement of the rack 106, but that said detent prevents movement of the shaft 100 in the opposite direction when the rod 92 moves to retracted position. When, however, it is desired to permit the pointer to return to zero position, the detent 136 is released from engagement with the ratchet wheel 132 by suitable mechanism provided for that purpose. As here shown (Figs. 5 and 6), said releasing mechanism comprises a rod 140 pivotally connected at one end 142 to the lower end of the pawl lever 134 and pivotally connected at its other end 144 to one arm 146 of a bell crank lever pivotally mounted on a bracket 148 by a pivot screw 150. The other end 152 of the bell crank lever is arranged to be engaged by the end of a push rod 154 slidable in an apertured lug 156 of said bearing 148. Said push rod 154 projects through an opening 158 in the front wall of the cabinet 10 and is provided with a knob 160 which upon being pressed inwardly causes the rod 154 to actuate the bell crank lever and the rod 140 to release the detent 136 from engagement with the ratchet wheel 132. The movement of the pointer 16 to zero position is limited by the fixed stop member 162 which is disposed in the path of movement of a pin 164 carried by the ratchet wheel 132.

The machine illustrated in Figs. 8 and 9 is used for testing the strength of the subject's arms and for this purpose, pivoted levers 218 and 220 disposed with their handles normally in the converging relation shown are arranged to be moved away from each other in actuating the movable member 74 against the spring resistance 80. While this machine is different from the machine shown in Fig. 1 in that it is used for the purpose of testing the strength of the arms of the subject, it is structurally very similar to the machine shown in Fig. 1, differing from the latter only in the arrangement of the actuating levers 218 and 220, as compared with the levers 18 and 20 of the above described machine, and in the arrangement for transmitting the motion of the levers to the horizontal shaft 62. Thus the levers 218 and 220 are vertically disposed and are pivotally mounted in brackets 224, with the handles of the levers which project from the cabinet 210 being disposed at a height of a man's shoulders. As shown in Fig. 9, the lever 238, which coresponds to the lever 38 of the machine, is fixed directly to the horizontal shaft 62 thus eliminating the vertical shaft 40 and the bevel gears 58 and 60 utilized in the machine shown in Fig. 1. As clearly shown in Fig. 9, the lever 238 is fixed to the horizontal shaft 62 and is connected to the actuating levers 218 and 220 by means of links 230 and 232, respectively, which are pivotally connected to the lower ends of said actuating levers and to the short arm 234 and long arm 236, respectively, of lever 238. As the other parts of this machine are the same in the machine shown in Fig. 1 further description of said parts are unnecessary and are, therefore, indicated generally by the same reference numerals. The operation of the present machine will be apparent, and it will be observed that when the subject forces the handles of the actuating levers 218 and 220 away from each other, the lever 238 rotates the shaft 62 in a clockwise direction, viewed from the front of the cabinet, thereby projecting the movable member 74 against the force of the resistance 80 to obtain an indication on the dial 14 of the subject's arm strength in a test of this kind. It will, of course, be understood that the dial 14 will be calibrated in accordance with arm strength indications, represented preferably in percentages of normal strength.

As shown in Fig. 10, the levers 218 and 220 are reversed so that the pushing strength of the arms of the subject may be tested. Thus, as here shown, the actuating levers 218 and 220 are disposed in normal diverging relation and are arranged to be moved toward each other against the resistance of the mechanism opposed in its operation by the resistance 80. Thus, by moving the handles of the levers 218 and 220 toward each other, the lever 238 is caused to rotate the shaft 62 in a clockwise direction (viewing the front of the cabinet) thereby operating the mechanism including the movable member 74 to project the latter against the resistance 80 and thereby to actuate the indicating mechanism through the rod 92 in the same manner as hereinbefore described. It will be understood that in actual practice a complete machine in its own cabinet and with the actuating levers 218 and 220 arranged as shown in Fig. 10 for the push testing strength is provided, so that in actual practice, it is unnecessary to alter the machine shown in Figs. 8 and 9 for adapting the same to the push strength test herein described.

In accordance with the present invention, provision is made for calibrating the machine and/or for testing the accuracy thereof. The means provided for this apparatus is illustrated in detail in Figs. 11 to 14. Said means comprises a lever bar 250 removably mounted in a U-shaped hanger 252 secured to and carried by a support 254 extending across the cabinet and positioned near the lower end of the rod 92. As shown in Figs. 11 and 12, one end of the bar is pivotally mounted on a removable pivot pin 256 releasably secured against accidental removal by cotter pins 258. Thus, the lever has a short arm 260 and a long arm 262. The end of the short arm 260 may be removably connected to the upper end of the member 74, and more specifically, to the bolt 91 by a double hook member 264, one hook portion 266 of which engages said bolt and the other hook portion 268 of which engages in a notch 270 at the end of the lever arm 260. A weight 272 is suspended from the lever bar 250 by a yolk 274 engageable with the upper surface of said bar in any one of a plurality of notches 276 located at predetermined distances from the pivot pin 256. Thus by connecting the lever bar 250 in the manner just described, and by suspending the weight 272 from one of the notches 276, a reading of the pointer 16 may be obtained and checked with a standard machine to calibrate or test the accuracy of the indicating means of a particular machine. It will be understood that the calibrating and testing means may be used for the machines shown in Figs. 8, 9 and 10 as well as for the machine shown in Fig. 1. In Fig. 11 the weight 272 is shown suspended from the outermost notch. In testing the machines the weight will be suspended from one of the notches depending upon the strength of the spring 80 in the particular machine according to its purpose. It will be understood that ordinarily it is sufficient to test the machine for the accuracy of the maximum reading which can be indicated on the dial. It will be further understood, of course, that normally when the machines are being used, the lever bar 262 and the hook 264 are removed.

Thus, it is seen that the machines shown or described herein are well adapted to accomplish the several objects of the present invention. It will be understood, however, that the invention is capable of other embodiments and that in the embodiments shown certain changes in the construction and arrangement of parts may be made. Therefore, I do not wish to be limited precisely to the present disclosure or to any part thereof except as may be required by the appended claims.

Having thus described my invention, what I claim and desire to secure by Letters Patents is:

1. Apparatus of the class described comprising a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft having two lever arms, a pair of levers pivotally mounted intermediate their ends whereby each lever has two arms arranged for movement toward and away from the corresponding arms, respectively, on the companion lever, one arm on each lever terminating in an end portion arranged to be manually engaged for actuating said pair of levers, a link pivotally connecting the other arm of one of said pair of levers to one arm of said first lever, and a link pivotally connecting the other arm of the other of said pair of levers to the other arm of said first lever.

2. Apparatus of the class described comprising a member movable from retracted position to projected position, a yieldable resistance opposing the movement of said member to projected position, means for projecting said member, comprising a rotary shaft and a connection between said shaft and member for moving the latter when the shaft is rotated, a second shaft geared to said first shaft, a lever pivoted to said second shaft intermediate its ends providing two lever arms, a pair of levers pivotally mounted intermediate their ends whereby each lever has two arms arranged for movement toward and away from the corresponding arms, respectively, on the companion lever, one arm on each lever terminating in an end portion arranged to be manually engaged for actuating said pair of levers, a link pivotally connecting the other arm of one of said pair of levers to one arm of said first lever, and a link pivotally connecting the other arm of the other of said pair of levers to the other arm of said first lever.

3. Apparatus of the class described comprising a member movable from retracted position to projected position, a yieldable resistance opposing the movement of said member to projected position, means for projecting said member comprising a rotary shaft, a gear fixed to shaft, and a rack carried by said member operable by said gear for projecting said member, a lever fixed to said shaft for rotating the latter, said lever having two lever arms, and a pair of levers pivotally mounted intermediate their ends whereby each lever has two arms arranged for movement toward and away from the corresponding arms, respectively, on the companion lever, one arm on each lever terminating in an end portion arranged to be manually engaged for actuating said pair of levers, a link pivotally connecting the other arm of one of said pair of levers to one arm of said first lever, and a link pivotally connecting the other arm of the other of said pair of levers to the other arm of said first lever.

4. Apparatus of the class described comprising a member movable from retracted position to projected position, a yieldable resistance opposing the movement of said member to projected position, means for projecting said member, indicating means operated by said member upon the projection thereof, and means for calibrating said indicating means comprising additional means for projecting said member comprising a fulcrum, a removable lever pivoted between its ends on said fulcrum having two lever arms, and means for connecting one arm of said lever to said member for projecting the latter when a force is applied to the other arm of the lever.

5. Apparatus of the class described comprising a member movable from retracted position to projected position, a yieldable resistance opposing the movement of said member to projected position, means for projecting said member, indicating means operated by said member upon the projection thereof, and means for calibrating said indicating means comprising additional means for projecting said member comprising a fulcrum, a removable lever pivoted between its ends on said fulcrum having two lever arms, and means for connecting one arm of said lever to said member for projecting the latter when a force is applied to the other arm of the lever, said resistance means opposing the movement of said member by said lever.

6. Apparatus of the class described comprising a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, means for actuating said lever comprising a pair of levers and a companion pair of links pivotally connected at their ends to said pair of levers and to opposite ends of said first lever, and means for retarding the movement of said member from projected position to retracted position comprising a fluid-resisted pivoted member having a rigid arm operatively connected to said member.

7. Apparatus of the class described comprising a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, means for actuating said lever comprising a second lever and a link pivotally connected to said two levers, said pair of levers having different lengths and said first lever having lever arms of different lengths connected by said links respectively to said pair of levers.

8. Apparatus of the class described comprising a member movable from retracted position to projected position, a yieldable resistance opposing the movement of said member to projected position, means for projecting said member comprising a rotary shaft and a connection between said shaft and member for moving the latter when the shaft is rotated, a lever for rotating said shaft, means for actuating said lever comprising a second lever and a link pivotally connected to said two levers, said pair of levers having different lengths, said first lever having lever arms of different lengths connected by said links respectively to said pair of levers, and means for retarding the movement of said member from projected position to retracted position comprising a fluid-resisted pivoted member having a rigid arm operatively connected to said member.

WILLIAM RABKIN.